US011661893B2

(12) United States Patent
Depalma et al.

(10) Patent No.: US 11,661,893 B2
(45) Date of Patent: May 30, 2023

(54) SYSTEMS AND METHODS OF SERVICING TURBOMACHINES

(71) Applicant: GE Avio S.r.l., Rivalta di Torino (IT)

(72) Inventors: Andrea Depalma, Rivoli (IT); Antonio Giuseppe D'Ettole, Rivoli (IT); Roberto Maddaleno, Lanzo (IT); Matteo Renato Usseglio, Turin (IT)

(73) Assignee: GE AVIO S.R.L., Rivalta di Torino (IT)

( * ) Notice: Subject to any disclaimer, the term of this patent is extended or adjusted under 35 U.S.C. 154(b) by 0 days.

(21) Appl. No.: 17/454,129

(22) Filed: Nov. 9, 2021

(65) Prior Publication Data

US 2022/0146043 A1 May 12, 2022

(30) Foreign Application Priority Data

Nov. 9, 2020 (IT) .................. 102020000026723

(51) Int. Cl.
*F02C 7/36* (2006.01)
*F02C 7/06* (2006.01)

(52) U.S. Cl.
CPC .............. *F02C 7/36* (2013.01); *F02C 7/06* (2013.01); *F05D 2230/72* (2013.01); *F05D 2260/40311* (2013.01); *F05D 2260/98* (2013.01)

(58) Field of Classification Search
CPC .......... F02C 7/36; F02C 7/06; F05D 2230/72; F05D 2230/80; F05D 2260/40311; F05D 2260/98
See application file for complete search history.

(56) References Cited

U.S. PATENT DOCUMENTS

| 5,775,177 | A | 7/1998 | Ikeda |
| 7,077,631 | B2 | 7/2006 | Eccles et al. |
| 7,451,592 | B2 | 11/2008 | Taylor et al. |
| 7,944,079 | B1 | 5/2011 | Signore et al. |
| 8,869,504 | B1 | 10/2014 | Schwarz et al. |
| 9,115,799 | B2 | 8/2015 | Russ |
| 2013/0180262 | A1* | 7/2013 | Duong ............. F02C 7/32 29/893 |
| 2015/0300323 | A1 | 10/2015 | Neumann et al. |
| 2017/0051823 | A1 | 2/2017 | Pikovsky et al. |
| 2017/0138214 | A1 | 5/2017 | Lepretre |
| 2018/0223732 | A1 | 8/2018 | Clements et al. |
| 2019/0085720 | A1 | 3/2019 | Pankaj et al. |
| 2020/0116104 | A1* | 4/2020 | Levisse ............. F02K 3/072 |

FOREIGN PATENT DOCUMENTS

| CN | 203892531 U | 10/2014 |
| CN | 209083346 U | 7/2019 |
| EP | 3511533 A1 | 7/2019 |
| EP | 3613977 A1 | 2/2020 |

* cited by examiner

*Primary Examiner* — Steven M Sutherland
(74) *Attorney, Agent, or Firm* — Venable LLP; Elizabeth C. G. Gitlin; Michele V. Frank

(57) ABSTRACT

A method of servicing a gas turbine engine, the method including preparing the gas turbine engine for service; installing a shaft protection cover to an aft end of a fan shaft of the gas turbine engine; installing an oil collector drum at least partially around a gearbox of the gas turbine engine; and removing at least a portion of the gearbox from the gas turbine engine.

19 Claims, 10 Drawing Sheets

SYSTEMS AND METHODS OF SERVICING TURBOMACHINES

GOVERNMENT CONTRACT

The project leading to this application has received funding from the Clean Sky 2 Joint Undertaking under the European Union's Horizon 2020 research and innovation program under grant agreement No. CS2-LPA-GAM-2018/2019-01.

CROSS REFERENCE TO RELATED APPLICATIONS

The present application claims the benefit of Italian Patent Application No. 102020000026723, filed on Nov. 9, 2020, which is hereby incorporated by reference herein in its entirety.

FIELD

The present subject matter relates generally to a turbomachine, and more particularly, to a turbine of a turbomachine having turbine rotor blades coupled using a split drum configuration.

BACKGROUND

Gas turbine engines generally include a turbine section downstream of a combustion section that is rotatable with a compressor section to rotate and operate the gas turbine engine to generate power, such as propulsive thrust. General gas turbine engine design criteria often include conflicting criteria that must be balanced or compromised, including increasing fuel efficiency, operational efficiency, and/or power output while maintaining or reducing weight, part count, and/or packaging (i.e. axial and/or radial dimensions of the engine).

Within at least certain gas turbine engines, the turbine section may include interdigitated rotors (i.e., successive rows or stages of rotating airfoils or blades). For example, a turbine section may include a turbine having a first plurality of low speed turbine rotor blades and a second plurality of high speed turbine rotor blades. The first plurality of low speed turbine rotor blades may be interdigitated with the second plurality of high speed turbine rotor blades. Such a configuration may result in a more efficient turbine.

The interdigitated rotors are typically coupled together through a gearbox. The gearbox may be located at an aft end of the gas turbine engine and interpose the first plurality of low speed turbine rotor blades with the second plurality of high speed turbine rotor blades. Like other components of the gas turbine engine, it is necessary to perform routine service operations on the gearbox, which typically requires removal of the gearbox from the gas turbine engine. Removing the gearbox from the gas turbine engine for service may result in oil from the gearbox and other components of the gas turbine engine spilling on the surrounding environment and/or operator performing the service. Moreover, oil may spill within the gas turbine engine itself. The resulting oil spill(s) can create a dangerous work environment and require additional servicing operations and repair to clean the gas turbine engine of oil. Accordingly a way of protecting the environment and operator as well as the gas turbine engine is desired.

BRIEF DESCRIPTION

Aspects and advantages of the invention will be set forth in part in the following description, or may be obvious from the description, or may be learned through practice of the invention.

In one exemplary aspect of the present disclosure, a method of servicing a gas turbine engine includes preparing the gas turbine engine for service, installing a shaft protection cover to an aft end of a fan shaft of the gas turbine engine, installing an oil collector drum at least partially around a gearbox of the gas turbine engine, and removing at least a portion of the gearbox from the gas turbine engine.

In an embodiment, the step of preparing the gas turbine engine for service can include removing one or more components of the engine to expose the gearbox, the one or more components including at least a tail cone.

In another embodiment, the method can further include removing oil from the gearbox using an oil extraction system in fluid communication with carrier oil piping of the gas turbine engine, wherein removing oil from the gearbox is performed prior to removing at least the portion of the gearbox from the gas turbine engine.

In an embodiment the step of removing at least the portion of the gearbox from the gas turbine engine causes oil to drip within the gas turbine engine, and wherein the oil protector drum is configured to guide a flow of dripping oil to one or more scavenge holes of the gas turbine engine.

In an embodiment the step of removing at least the portion of the gearbox comprises translating a carrier of the gearbox and one or more planetary gears of the gearbox along an axial direction of the gas turbine engine at a location between the shaft protection cover and the oil collector drum along a radial direction of the gas turbine engine.

In an embodiment, the method further includes, after removing the portion of the gearbox, removing at least one of the shaft protection cover and the oil collector drum from the gas turbine engine, and removing a remaining portion of the gearbox from the gas turbine engine.

In an embodiment, the gearbox comprises a planetary gear set and the remaining portion of the gearbox comprises a ring gear of the planetary gear set.

In an embodiment the step of installing the shaft protection cover is performed by sliding the shaft protection cover along an axial direction of the gas turbine engine over the after end of the fan shaft such that an inner member of the shaft protection cover is positioned inside of the fan shaft along a radial direction of the gas turbine engine and an outer member of the shaft protection cover is positioned outside of the fan shaft along the radial direction.

In an embodiment, the step of installing the oil collector drum is performed by coupling the oil collector drum to a low-pressure shaft flange of the gas turbine engine.

In one exemplary aspect of the present disclosure, a kit for servicing a gas turbine engine includes a shaft protection cover configured to be installed adjacent to an aft end of a fan shaft of the gas turbine engine, and an oil collector drum configured to be installed around a gearbox of the gas turbine engine. The kit is usable during servicing operations of the gas turbine engine to manage a flow of oil from the gearbox, an area surrounding the gearbox, or both.

In an embodiment, the oil collector drum includes a body having a sidewall and substantially open axial ends. One of the substantially open axial ends of the oil collector drum is configured to be coupled with the gas turbine engine to guide free engine fluids to a scavenge hole of the gas turbine engine.

In an embodiment, the oil collector drum is configured to attach to a low-pressure shaft flange of the gas turbine engine.

In an embodiment, the oil collector drum is configured such that the gearbox can pass through the oil collector drum during a gearbox removal operation.

In an embodiment, the oil collector drum is configured to guide the flow of the oil to one or more scavenge holes of the gas turbine engine.

In an embodiment, the shaft protection cover includes an inner member and an outer member. The shaft protection cover can be configured to receive the aft end of the fan shaft between the inner member and the outer member. In a more particular embodiment, the shaft protection cover is configured to form an interference fit with the fan shaft.

In one exemplary aspect of the present disclosure, a tool for servicing a gas turbine engine includes at least one of a shaft protection cover configured to be installed adjacent to an aft end of a fan shaft of the gas turbine engine, and an oil collector drum configured to be installed at least partially around a gearbox of the gas turbine engine. The tool can be configured to be used during servicing operations of the gas turbine engine to manage a flow of oil from the gearbox, an area surrounding the gearbox, or both.

In an embodiment, attaching the tool to the gas turbine engine is configured to be performed after removing one or more components of the gas turbine engine to expose the gearbox, the one or more components including at least a tail cone.

In an embodiment, the tool is configured to be used with a gas turbine engine having an aft mounted gearbox.

In an embodiment, the tool is configured to be attached directly to the engine using native engine hardware.

These and other features, aspects and advantages of the present invention will become better understood with reference to the following description and appended claims. The accompanying drawings, which are incorporated in and constitute part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended Figs., in which.

DETAILED DESCRIPTION

Figure 1:
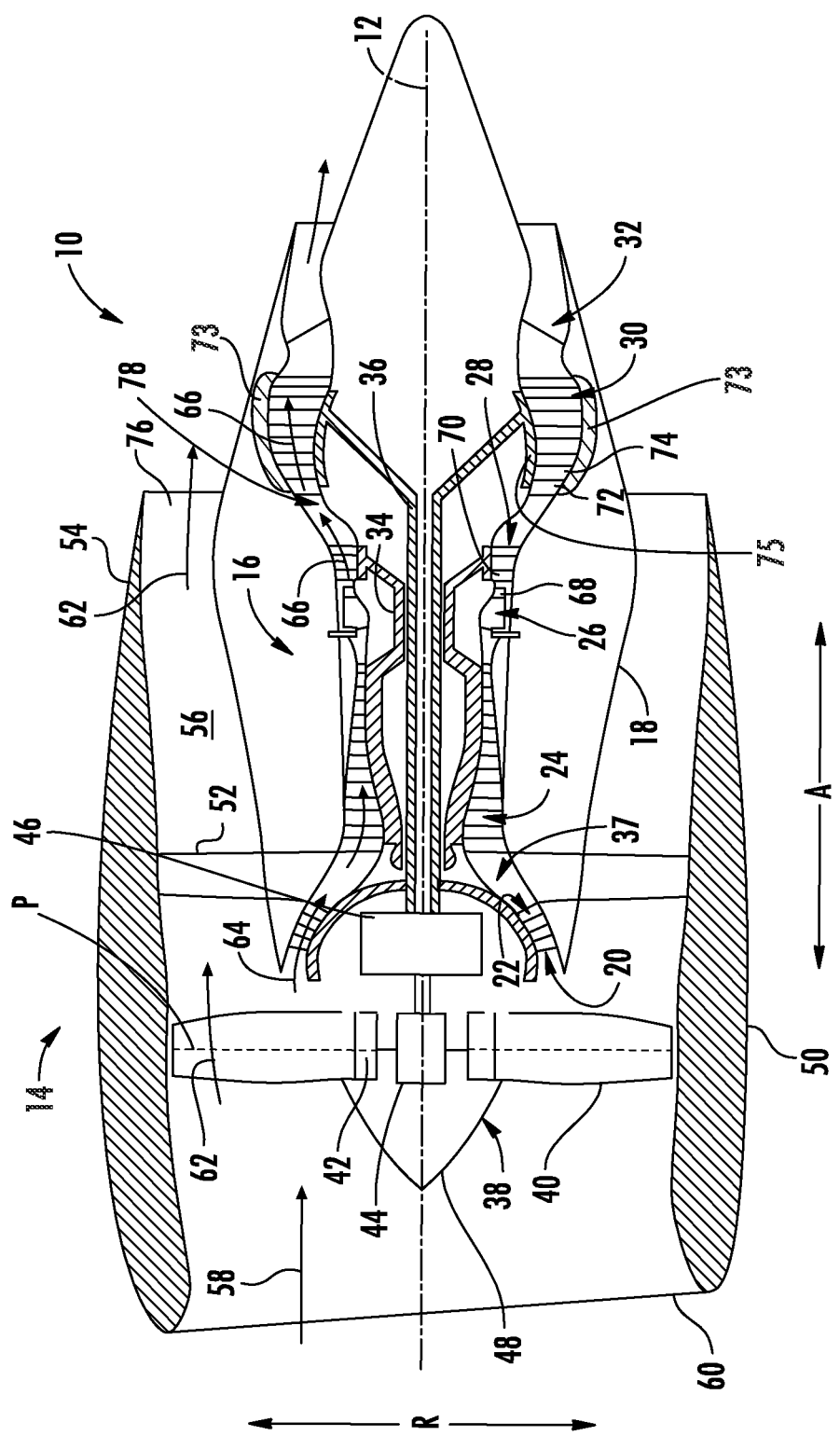
FIG. 1 is a schematic, cross-sectional view of an exemplary gas turbine engine incorporating an exemplary embodiment of a turbine section according to an aspect of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, affixing, or attaching, as well as indirect coupling, affixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Gas turbine engines generally require routine, or semi routine, servicing operations. Several servicing operations may pertain to the gearbox of the gas turbine engine. Typically, this requires removal of the gearbox, or a portion thereof, from the gas turbine engine. During the removal process, it is not uncommon for oil and other engine fluids associated with the gas turbine engine, e.g., the gearbox, to drip onto exposed surfaces of the gas turbine engine, the environment in which the gas turbine engine is disposed, and/or the operator performing the servicing operation. In accordance with one or more embodiments described herein are provided oil maintenance tools which are configured to manage the flow of such oils and engine fluids to prevent undesirable contact with one or more portions of the gas turbine engine, the environment, and/or the operator. The oil maintenance tools can include a shaft protection cover configured to protect an aft section of a fan shaft and an oil collector drum configured to protect the environment and operator from dripping oil. The oil collector drum can route dripping oil from the gearbox and associated components of the gas turbine engine to one or more scavenge holes of the gas turbine engine.

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline 12 provided for reference), a radial direction R, and a circumferential direction (i.e., a direction extending about the axial direction A; not depicted). In general, the turbofan 10 includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. The compressor section, combustion section 26, and turbine section together define a core air flowpath 37 extending from the annular inlet 20 through the LP compressor 22, HP compressor 24, combustion section 26, HP turbine section 28, LP turbine section 30 and jet nozzle exhaust section 32. A high pressure (HP) shaft or spool 34 drivingly connects the HP turbine 28 to the HP compressor 24. A low pressure (LP) shaft or spool 36 drivingly connects the LP turbine 30 to the LP compressor 22.

For the embodiment depicted, the fan section 14 includes a variable pitch fan 38 having a plurality of fan blades 40 coupled to a disk 42 in a spaced apart manner. However, it should be understood that other types of fan sections can be used without deviating from the scope of the invention. As depicted, the fan blades 40 extend outwardly from disk 42 generally along the radial direction R. Each fan blade 40 is rotatable relative to the disk 42 about a pitch axis P by virtue of the fan blades 40 being operatively coupled to a suitable actuation member 44 configured to collectively vary the pitch of the fan blades 40, e.g., in unison. The fan blades 40, disk 42, and actuation member 44 are together rotatable about the longitudinal axis 12 by LP shaft 36 across a power gear box 46. The power gear box 46 includes a plurality of gears for stepping down the rotational speed of the LP shaft 36 to a more efficient rotational fan speed.

Referring still to the exemplary embodiment of FIG. 1, the disk 42 is covered by rotatable front spinner cone 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. It should be appreciated that for the embodiment depicted, the nacelle 50 is supported relative to the core turbine engine 16 by a plurality of circumferentially-spaced outlet guide vanes 52. Moreover, a downstream section 54 of the nacelle 50 extends over an outer portion of the core turbine engine 16 so as to define a bypass airflow passage 56 therebetween.

During operation of the turbofan engine 10, a volume of air 58 enters the turbofan 10 through an associated inlet 60 of the nacelle 50 and/or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to an inner casing (not shown) and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of a first plurality of LP turbine rotor blades 72 that are coupled to an outer drum 73, and a second plurality of LP turbine rotor blades 74 that are coupled to an inner drum 75. The first plurality of LP turbine rotor blades 72 and second plurality of LP turbine rotor blades 74 are alternatingly spaced and rotatable with one another through a gearbox (not shown) to together drive the LP shaft or spool 36, thus causing the LP shaft or spool 36 to rotate. It should be understood that the first plurality of LP turbine rotor blades 72 and the second plurality of LP turbine rotor blades 74 can therefore be coupled to different shafts. For example, the first plurality of LP turbine rotor blades 72 can be coupled to a first shaft (not shown) through the outer drum 73 while the second plurality of LP turbine rotor blades 72 can be coupled to a second shaft, such as shaft 36, through the inner drum 75. A gearbox (not shown, see FIG. 2) may be provided to combine a torque output from the two shafts to, e.g., supports operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

It should be appreciated, however, that the exemplary turbofan engine 10 depicted in FIG. 1 is by way of example only, and that in other exemplary embodiments, the turbofan engine 10 may have any other suitable configuration. For example, in other exemplary embodiments, the turbine fan engine 10 may instead be configured as any other suitable turbomachine including, e.g., any other suitable number of shafts or spools, and excluding, e.g., the power gearbox 46 and/or fan 38, etc. Accordingly, it will be appreciated that in other exemplary embodiments, the turbofan engine 10 may instead be configured as, e.g., a turbojet engine, a turboshaft engine, a turboprop engine, etc., and further may be configured as an aeroderivative gas turbine engine or industrial gas turbine engine.

Figure 2:
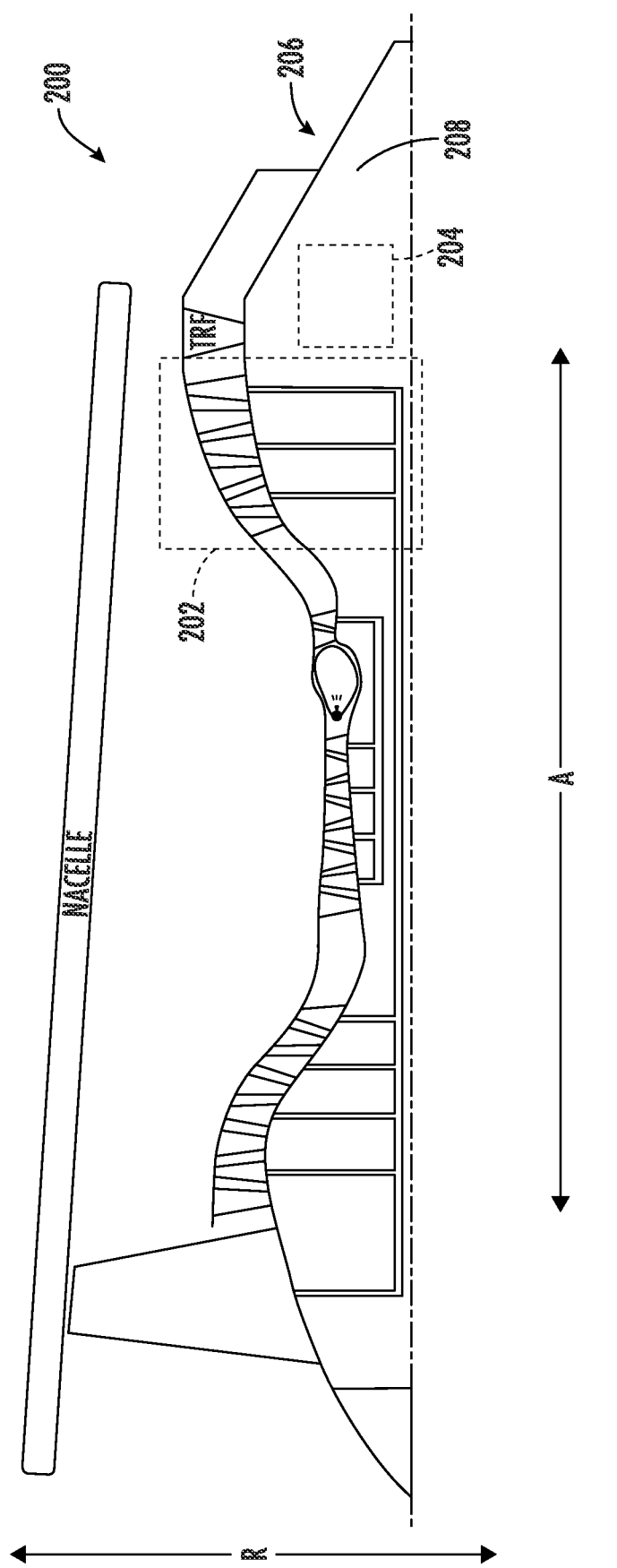
FIG. 2 is a schematic, cross-sectional view of a portion of an exemplary gas turbine engine according to an aspect of the present disclosure.

FIG. 2 illustrates a partial, cross-sectional schematic view of a gas turbine engine 200 including a low pressure turbine 202 disposed upstream of a gearbox 204, or rather at least partially forward of the gearbox 204 along an axial direction A. The gearbox 204 is located adjacent to an aft section 206 of the engine 200 in front of a tail cone section 208. The gearbox 204 is located adjacent to a turbine rear frame (TRF) described in greater detail hereinafter. In a more particular embodiment, the gearbox 204 can be located under the TRF (i.e., inward of the TRF along the radial direction R).

Figure 3:
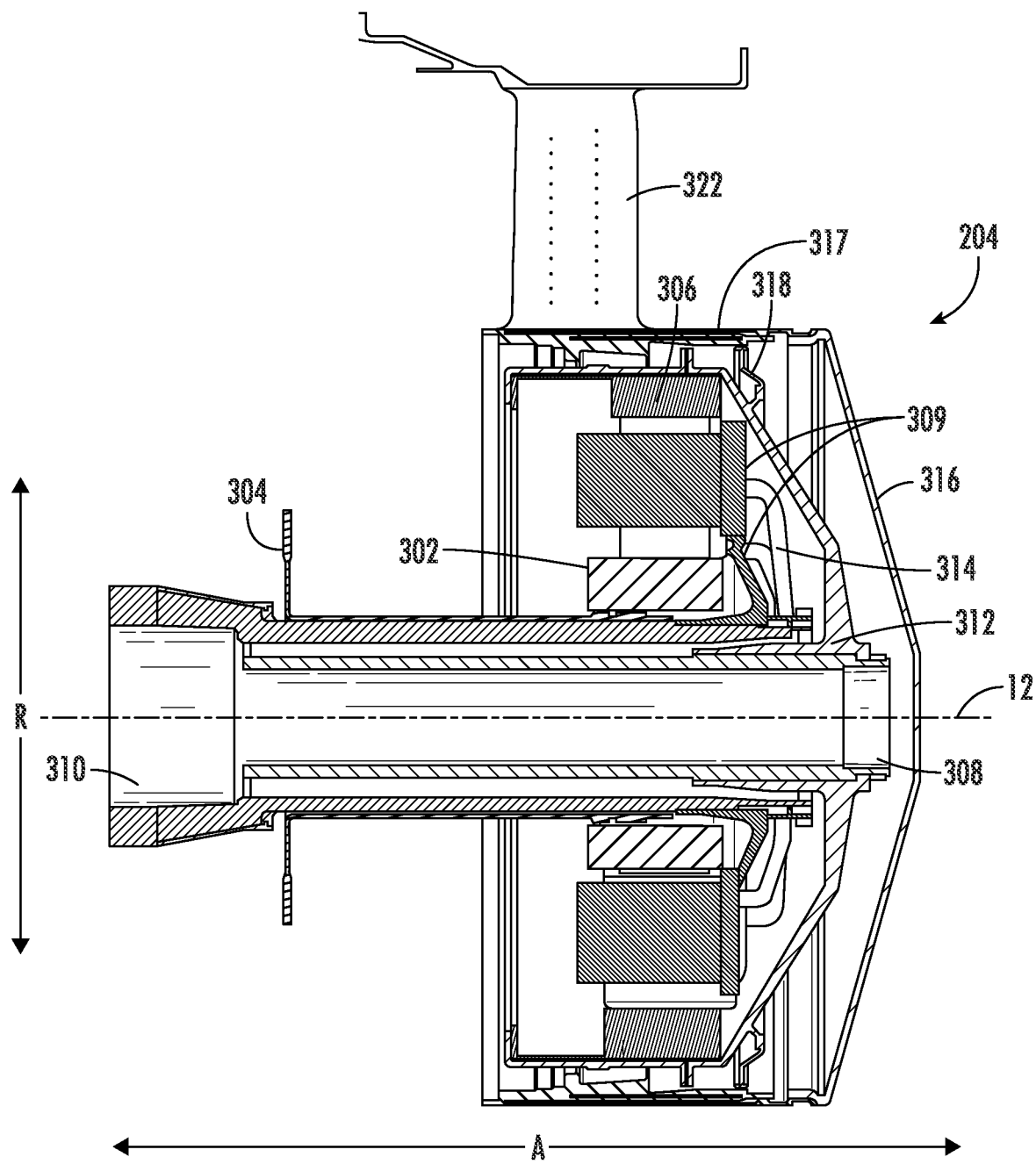
FIG. 3 is a schematic, cross-sectional view of a gearbox of an exemplary gas turbine engine according to an aspect of the present disclosure.

FIG. 3 illustrates an enlarged view of the gearbox 204 shown in FIG. 2. The gearbox 204 depicted in FIG. 3 is shown in accordance with an exemplary embodiment of the present disclosure and generally includes a planetary gear set including a sun gear 302 coupled with a sun shaft 304, a ring gear 306 circumferentially extending around the sun gear 302, and a carrier 308 disposed radially between the sun gear 302 and the ring gear 306. A plurality of planet gears (not illustrated) are disposed radially between and integrate the sun gear 302 and ring gear 306. The planetary gears are rotatably mounted on the carrier 309A fan shaft 308 extends axially through the sun shaft 304 and a static part 310 of the gearbox 204. A low speed cone shaft 312 is disposed radially around the fan shaft 308. Carrier oil piping 314 is disposed between the carrier 308 and the low speed cone shaft 312. The carrier oil piping 314 carries oil associated with the gearbox 204. The carrier oil piping 314 can include, for example, piping, orifices, and other fluid coupling elements configured to route oil within the gearbox 204. An engine cover 316 is disposed over the gearbox 204 and covers the engine 200 and gearbox 204 from ingress of debris and egress of gearbox 204 fluids. A shaft seal 318 can extend between the low speed cone shaft 312 and a TRF inner ring 317. It should be understood that one or more elements of the engine 200 and/or gearbox 204 may be omitted from FIG. 3 for simplicity of understanding the invention. Moreover, one or more elements of the engine 200 may be rearranged, added, or otherwise modified in one or more non-illustrated embodiments.

Use of an aft-mounted gearbox 204, such as the one depicted in FIG. 3, may permit faster disassembly of the engine 200, and more particularly faster disassembly of the gearbox 204 from the engine 200 as compared to conventionally located gearboxes located at a forward portion of the engine 200 as removal of the exhaust nozzle and exhaust cone of the engine 200 can allow for quick access to the gearbox 204.

Gearbox maintenance typically requires removal of the gearbox 204 from the engine 200. When removing the gearbox 204 from the engine 200 the control of dripping oil can become an important consideration. In particular, oil from the gearbox 204 and/or other components of the engine 200 can leak outside of the engine 200 during and after disassembly making for a dangerous or unclean working environment. Moreover, oil leaking within the engine 200 can cause engine problems which might require further servicing, resulting in additional downtime and increased costs. To prevent oil from leaking from the gearbox 204 or other parts of the engine 200 and causing problems, the present invention utilizes oil maintenance tools including, for example, a shaft protection cover and an oil collector drum to route oil in a desirable manner. The shaft protection cover and oil collector drum may be used separately or together to manage oil leakage when servicing the gearbox 204 and/or other components of the engine 200. In certain instances, the shaft protection cover and oil collector drum may be part of an oil maintenance kit. The kit can be kept onsite at a service station or repair shop and used by operators to manage oil during servicing operations.

Figure 4:
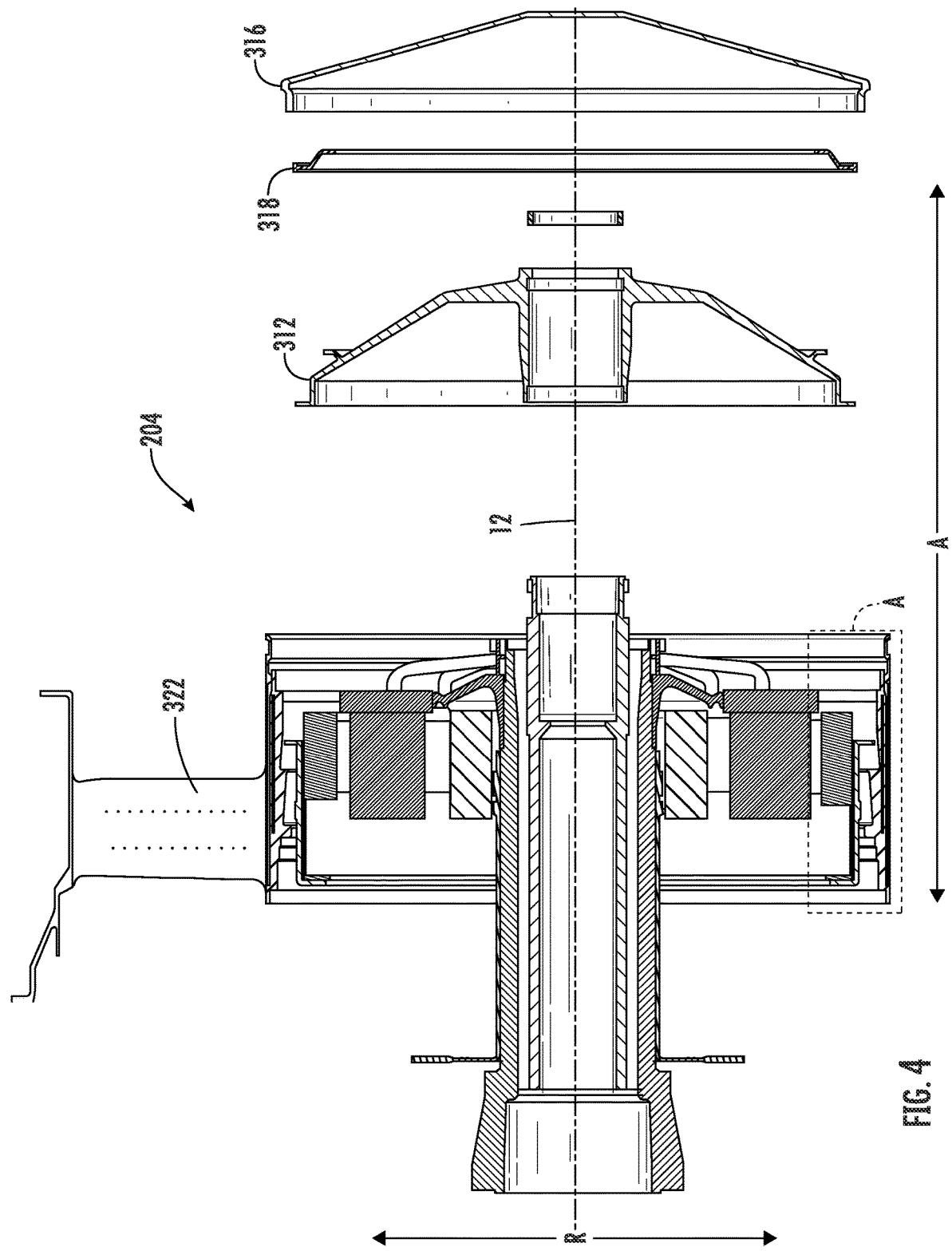
FIG. 4 is a schematic, cross-sectional view of a gearbox of an exemplary gas turbine engine with a portion thereof being removed during a servicing operation according to an aspect of the present disclosure.
Figure 5:
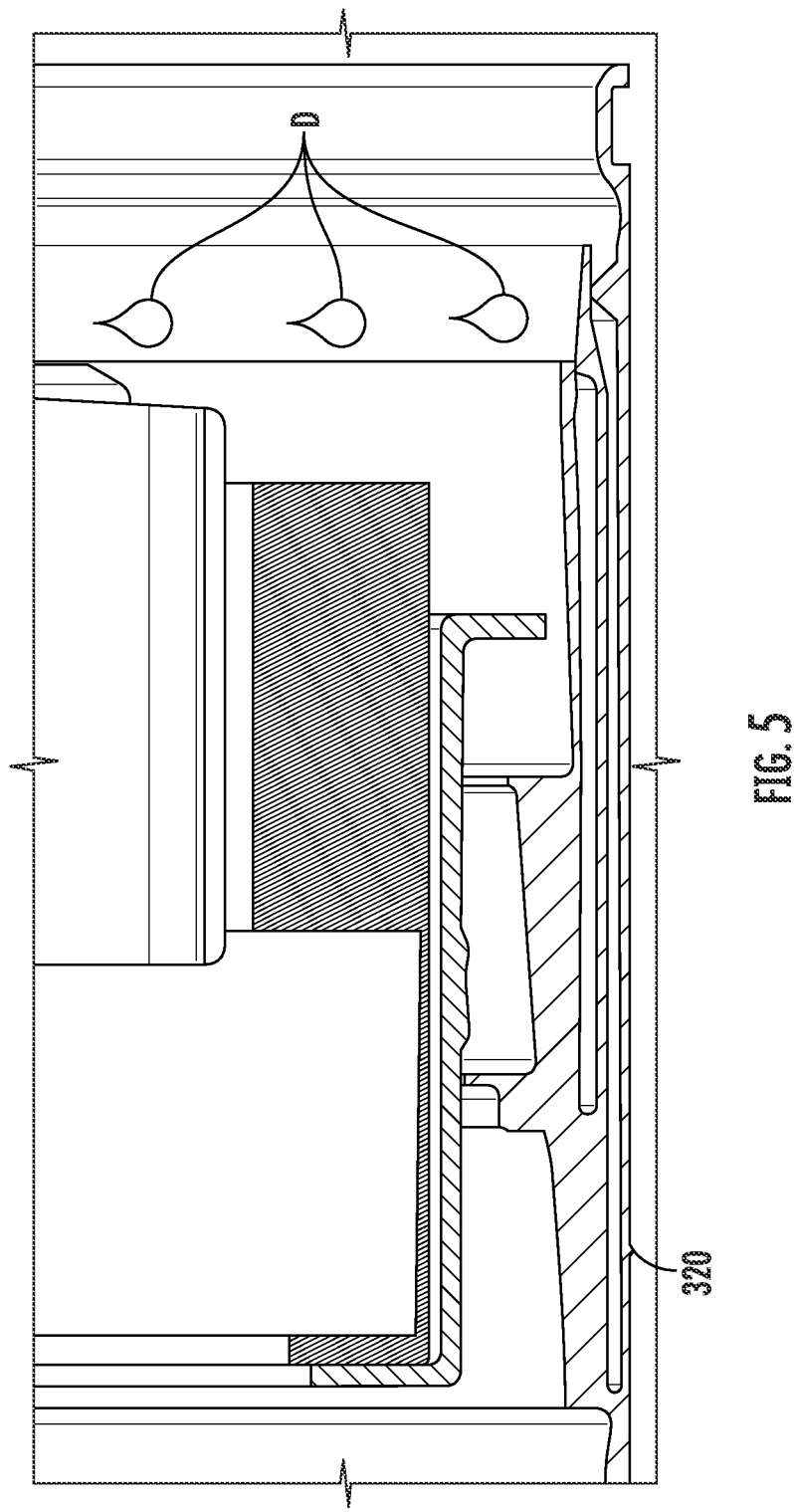
FIG. 5 is an enlarged schematic, cross-sectional view of a portion of the exemplary gas turbine engine depicted in box A of FIG. 4 according to an aspect of the present disclosure.

Referring to FIG. 4, gearbox maintenance operations can generally begin by removing components of the engine 200 to access an area in which the gearbox 204 is disposed within. For example, the engine cover 316, shaft seal 318, and low speed cone shaft 312, along with one or more fasteners, can be removed from the engine 200 to permit access to the gearbox 204. In certain instances, removal of the components can occur by axially translating the components away from an aft end of the engine 200. After removing the components of the engine 200, the gearbox 204 may be in contact with the external environment in which the engine 200 is disposed within. Oil droplets D from the engine components may be collected in one or more oil scavenge holes 320 shown in FIG. 5, which is an enlarged view of Box A in FIG. 4. Prior to removal of the gearbox 204, such oil droplets D may naturally find their way to the oil scavenge holes 320 through proper engine design utilizing, for example, gravitational force.

Figure 6:
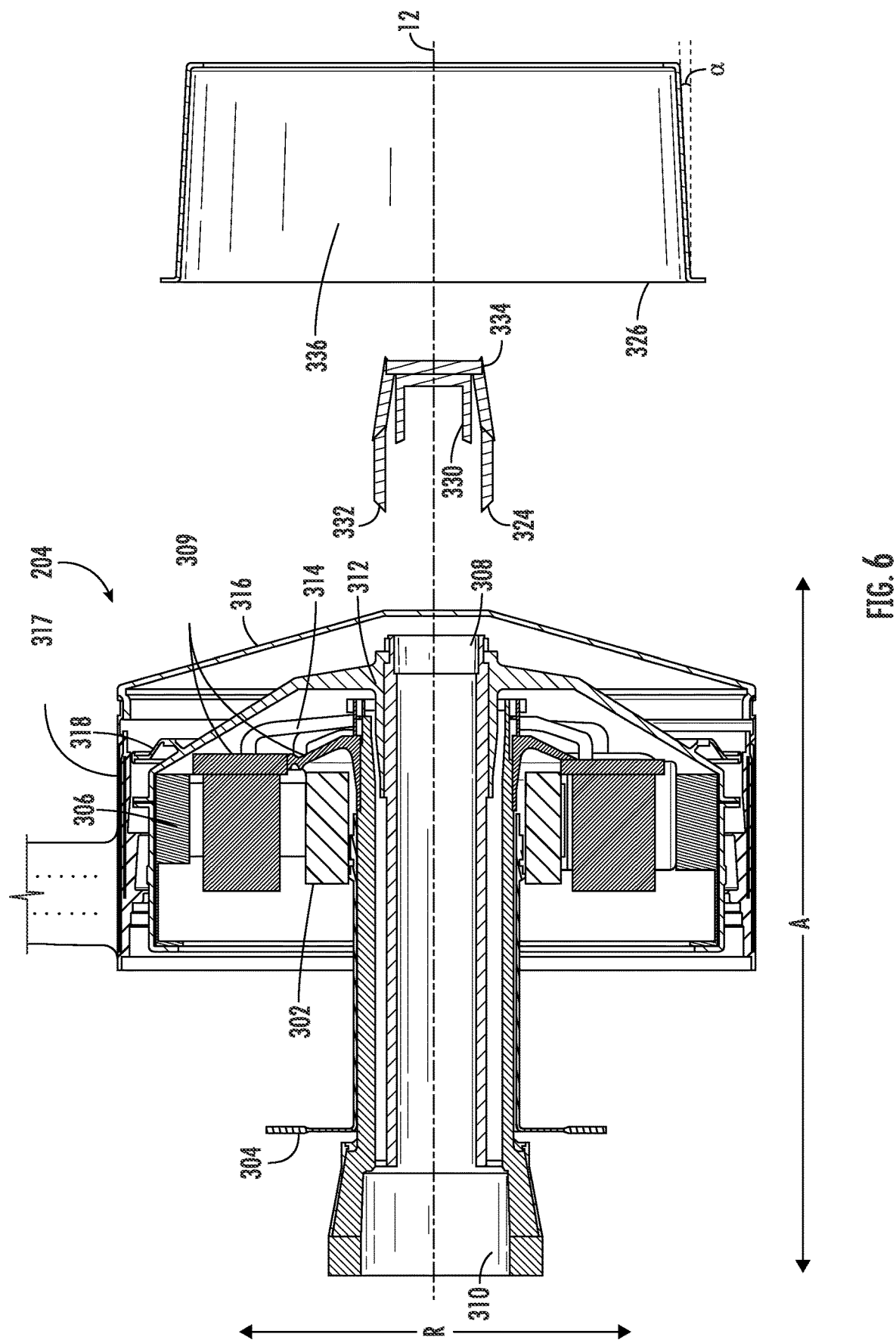
FIG. 6 is a schematic, cross-sectional view of a gearbox of an exemplary gas turbine engine and oil maintenance tools for use in managing oil flow from the gas turbine engine during servicing operations according to an aspect of the present disclosure.
Figure 7:
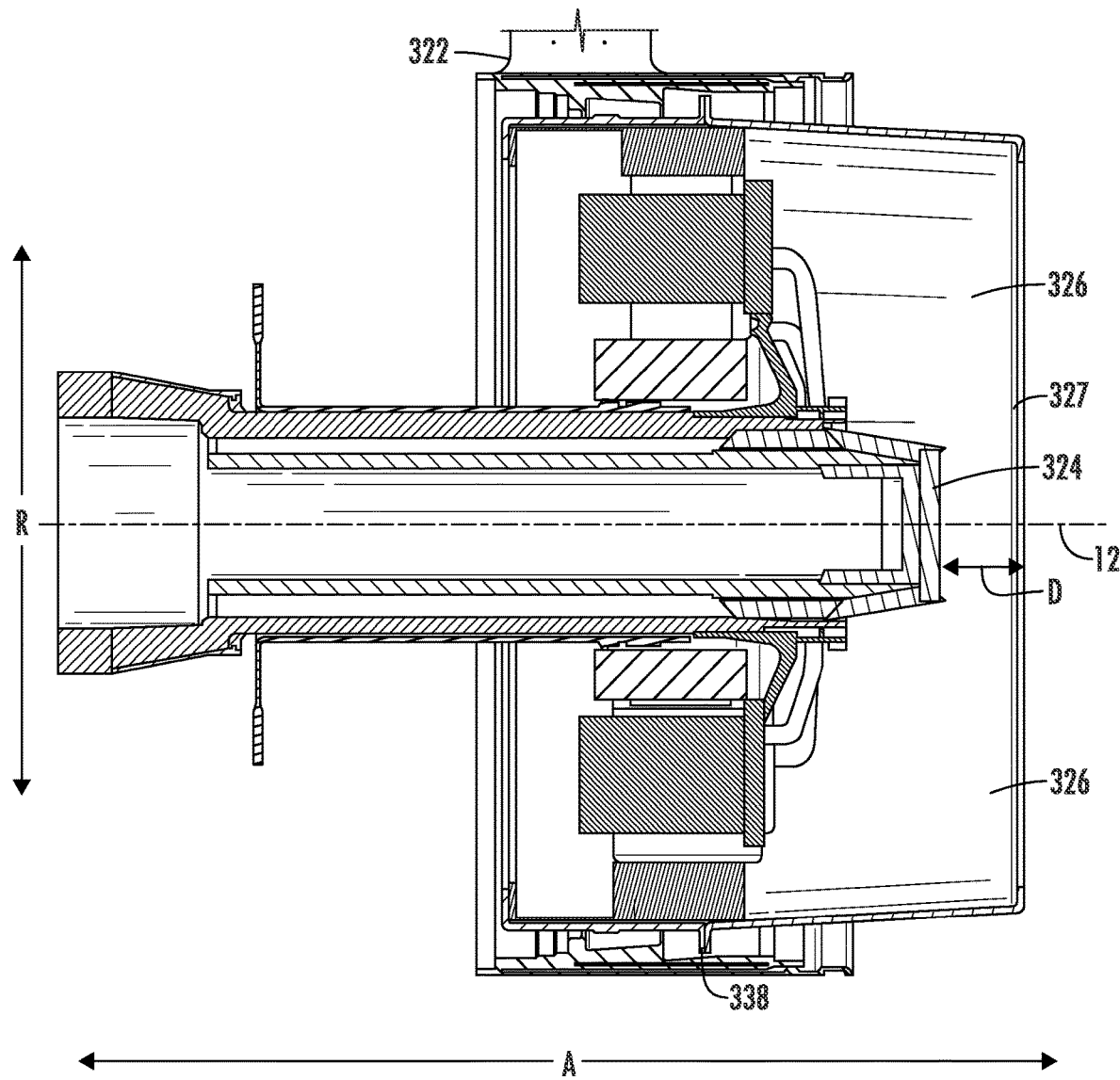
FIG. 7 is a schematic, cross-sectional view of a gearbox of an exemplary gas turbine engine with the oil maintenance tools depicted in FIG. 6 in an installed state according to an aspect of the present disclosure.

After exposing the gearbox 204 to the external environment as shown in FIG. 4, the operator can install at least one of the aforementioned oil maintenance tools, such as the shaft protection cover 324 and the oil collector drum 326, as shown in FIGS. 6 and 7, to the engine 200. The shaft protection cover 324 can include a body configured to be installed at, or adjacent to, an aft end 328 of the fan shaft 308. The body of the shaft protection cover 324 can include an inner member 330 and an outer member 332 spaced apart from one another by a radial gap. In the illustrated embodiment, the outer member 332 is longer than the inner member 330. By way of example, the outer member 332 can be at least 10% longer than the inner member 330, such as at least 20% longer than the inner member 330, such as at least 40% longer than the inner member 330, such as at least 50% longer than the inner member 330, such as at least 60% longer than the inner member, such as at least 70% longer than the inner member 300, such as at least 100% longer than the inner member. In other embodiments, the inner and outer members 330 and 332 can have same, or generally same, lengths as compared to one another. In yet other embodiments, the inner member 330 can be longer than the outer member 332. By way of example, the outer member 332 can be sized to seat at a location where the low speed cone shaft 312 was previously removed from.

The aft end 328 of the fan shaft 308 can be disposed between the inner and outer members 330 and 332 when the shaft protection cover 324 is in the installed state. In an embodiment, the radial gap between the inner and outer members 330 and 332 can taper towards an end cap 334 of the shaft protection cover 324. That is, the space between the inner and outer members 330 and 332 can decrease near the end cap 334. This can match the profile of the fan shaft 308. In certain instances, this tapered profile can be seen along the outer member 332 as a tapered sidewall of the shaft protection cover 324. Once positioned on the fan shaft 308, the shaft protection cover 324 can protect the fan shaft 308 from contamination, such as for example, with oil or other engine fluids which might come into contact therewith, such as during gearbox 204 removal operations.

In an embodiment, the shaft protection cover 324 can form an interference fit with the fan shaft 308. In another embodiment, the shaft protection cover 324 can be secured to the fan shaft 308 using one or more fasteners (e.g., threaded or non-threaded fasteners, clamps, clasps, and the like). In certain instances, an operator can rotate the shaft protection cover 324 while sliding it onto the fan shaft 308. Use of lubricant may be used to reduce sliding forces in instances where the shaft protection cover 324 does not slide fully into a seated position relative to the fan shaft 308.

Protecting the engine 200 from oil can further include installation of the oil collector drum 326 on the engine 200. The oil collector drum 326 can include, for example, a generally cylindrical body comprising a sidewall defining a radially outer surface and a radially inner surface. The radially inner surface can define a lumen 336 passing axially through the oil collector drum 326. In an embodiment, the lumen 336 can define a diameter no less than a diameter necessary to remove the gearbox 204 or other desired components from the engine 200. For instance, the gearbox 204 can define a maximum diameter, $D_G$, that is less than a diameter, $D_L$, of the lumen 336. By way of example, $D_G$ can be less than 99.9% $D_L$, such as less than 99.5% $D_L$, such as less than 99% $D_L$, such as less than 98% $D_L$, such as less than 97% $D_L$, such as less than 96% $D_L$, such as less than 95% $D_L$, such as less than 90% $D_L$. In such a manner, the gearbox 204 can be passed through the lumen 336 without contacting the oil collector drum 326.

In an embodiment, the lumen 336 can have a frustoconical shape. That is, the radially inner sidewall of the oil collector drum 326 can have a tapered profile. By way of example, the radially inner sidewall can have a taper, as depicted in FIG. 6 by angle α that is at least 0.1°, such as at least 1°, such as at least 2°, such as at least 3°, such as at least 4°, such as at least 5°, such as at least 10°. The angle, a, cannot exceed a threshold angle at which point the gearbox 204 cannot pass through the lumen 336. For example, a cannot exceed 80°. In certain instances, the angle of the radially inner sidewall can be uniform as measured around the circumference of the oil collector drum 326. In other instances, the angle of the radially inner sidewall can vary. For instance, the angle of the radially inner sidewall may be greater along a lower portion of the oil collector drum 326 as compared to an upper portion of the oil collector drum 326. In this regard, the diameter of the lumen 336 can be maintained while the angled portion of the oil collector drum 326 can effectively funnel oil droplets to the oil scavenge holes 320.

In an embodiment, the oil collector drum 326 can be installed on the engine 200 in a manner so as to utilize native hardware (e.g., existing connection elements) of the engine 200. For example, after removing components of the engine 200 to permit access to the gearbox 204, one or more native hardware components of the engine 200 which previously served to secure the removed component can be utilized to secure the oil collector drum 326. By way of example, the low-pressure shaft flange 338 of the engine 200 may be utilized to connect the oil collector drum 326 relative to the engine 200. The oil collector drum 326 may be attached to the engine 200, for example, using one or more fasteners (e.g., threaded- or non-threaded fasteners), clips, bayonet connections, and the like. In a particular embodiment, the oil collector drum 326 can be secured to the engine 200 using the same hardware which previously held the removed component in place relative to the engine 200. Once attached to the engine 200, the oil collector drum 326 can protect the internal structure of the TRF 322 from oil leakage which might occur, for example, when removing the gearbox 204 from the engine 200. The oil collector drum 326 may further prevent oil droplets from leaking to the external environment and/or contacting the operator performing the servicing operation.

FIG. 7 illustrates the engine 200 with the shaft protection cover 324 and oil collector drum 326 in the installed state. As depicted, a rearmost portion of the engine assembly with the oil collector drum 326 installed is defined by the oil collector drum 326. In such a manner, dripping oil cannot fall out of the engine 200 or to another portion of the engine which might otherwise be exposed. In an embodiment, the aft end of the oil collector drum 326 can be spaced apart from a nearest component of the engine 200 by a distance, D, that is at least 1 mm, such as at least 2 mm, such as at least 5 mm, such as at least 10 mm, such as at least 25 mm, such as at least 50 mm, such as at least 75 mm. The distance, D, may be impacted by the angle of the radially inner sidewall of the oil collector drum 326.

In certain instances, the radially inner surface of the oil collector drum 326 can include an oil retention feature 327, such as a groove, ridge, flange, or the like configured to provide a barrier against oil spilling over the rearmost edge of the oil collector drum 326. In the illustrated embodiment, the oil retention feature 327 comprises a flange extending radially inward from the radially inner sidewall of the oil collector drum 326. As previously described, an inner diameter of the oil retention feature 327 may be greater than a diameter of the gearbox 204 and/or other components which are to be passed therethrough during the servicing operation.

Figure 8:
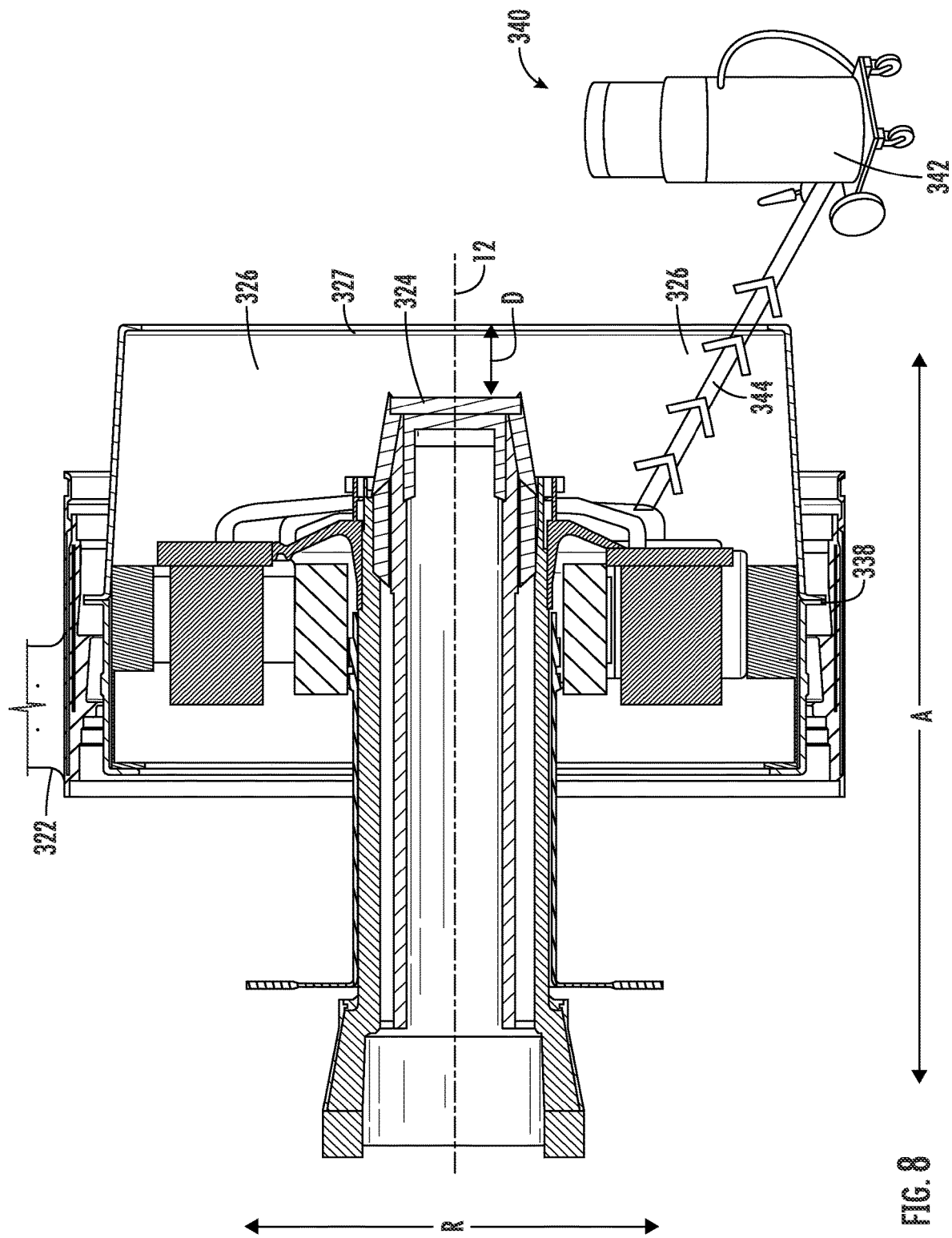
FIG. 8 is a schematic, cross-sectional view of a gearbox of an exemplary gas turbine engine with an oil suction system configured to extract oil from the gas turbine engine according to an aspect of the present disclosure.

In certain instances, it may be desirable to remove oil from inside the engine 200, such as from the gearbox 204 prior to removing the gearbox 204. FIG. 8 illustrates an oil suction system 340 configured to extract oil from the engine 200, such as extract oil from the gearbox 204. The oil extraction system 340 can include, for example, a vacuum 342 coupled to the carrier oil piping 314 through a hose 344. When engaged, the vacuum 342 can apply a negative pressure (suction) to the carrier oil piping 314, causing oil contained within the gearbox 204 to drain therefrom. Other suction elements and/or oil removal techniques may be utilized to remove the oil from the engine 200. In certain instances, it may be desirable to utilize the oil extraction system 340 after installing the oil collector drum 326 and/or shaft protection cover 324. Thus, oil which might spill or leak during the extraction process can be properly routed to the oil scavenge holes 320. In other instances, extraction of oil utilizing the oil extraction system 340 can be performed prior to installation of the oil collector drum 326 and/or shaft protection cover 324.

Figure 9:
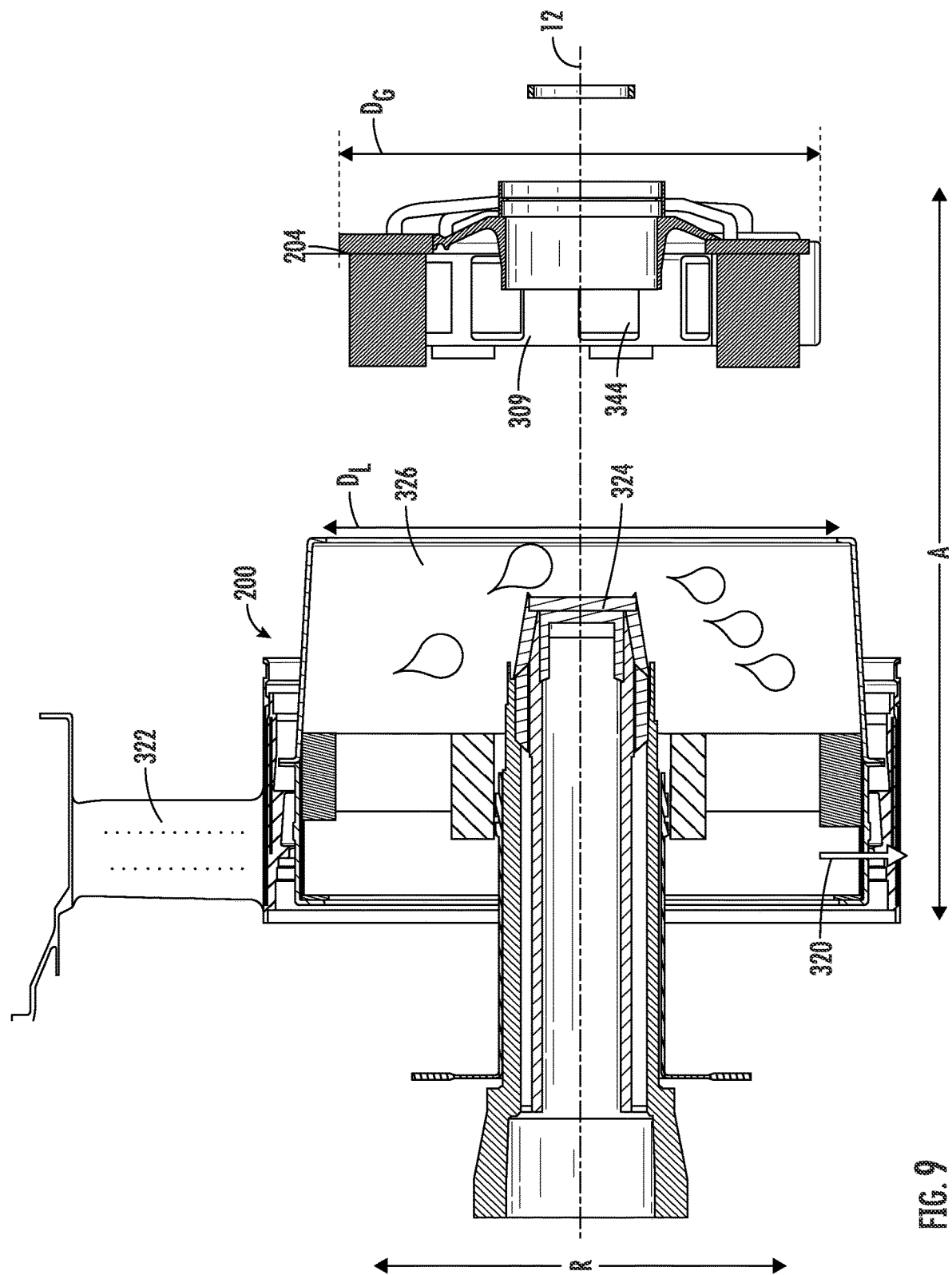
FIG. 9 is a schematic, cross-sectional view of a gearbox of an exemplary gas turbine engine partially removed from the gas turbine engine for servicing operations according to an aspect of the present disclosure.

After removing the oil from the gearbox 204, it may be possible to remove the gearbox 204, or a portion thereof, from the engine 200. FIG. 9 illustrates a cross-sectional view of the removal operation. While a majority of the oil contained in the gearbox 204 was extracted in the step illustrated in FIG. 8, some oil may remain within the engine 200. Accordingly, as the gearbox 204, or a portion thereof, is removed from the engine 200, oil droplets can be guided by the oil collection drum 326 towards the scavenge holes 320 of the TRF 322. In such a manner, the oil can be contained and properly routed within the engine 200 and prevented from spilling on the ground and/or the operator performing the servicing operation.

Removal of the gearbox 204, as shown in FIG. 9, includes removal of at least the carrier structure 309 and planetary gears 344. A spline disconnection can create significant oil drainage from ducts connecting transfer tubes to the carrier pins. That oil is collected in the scavenge holes 320 without contacting the aft end 328 of the fan shaft 308 thanks to the shaft protection cover 324 and oil collector drum 326. Once the gearbox 204 is removed, the oil protector drum 326 and/or shaft protection cover 324 can either remain fixed to the engine 200 or removed. After servicing of the gearbox 204 is completed, the gearbox 204 can be reinstalled on the engine 200. This can be performed with or without the oil protector drum 326 and/or shaft protection cover 324.

Figure 10:
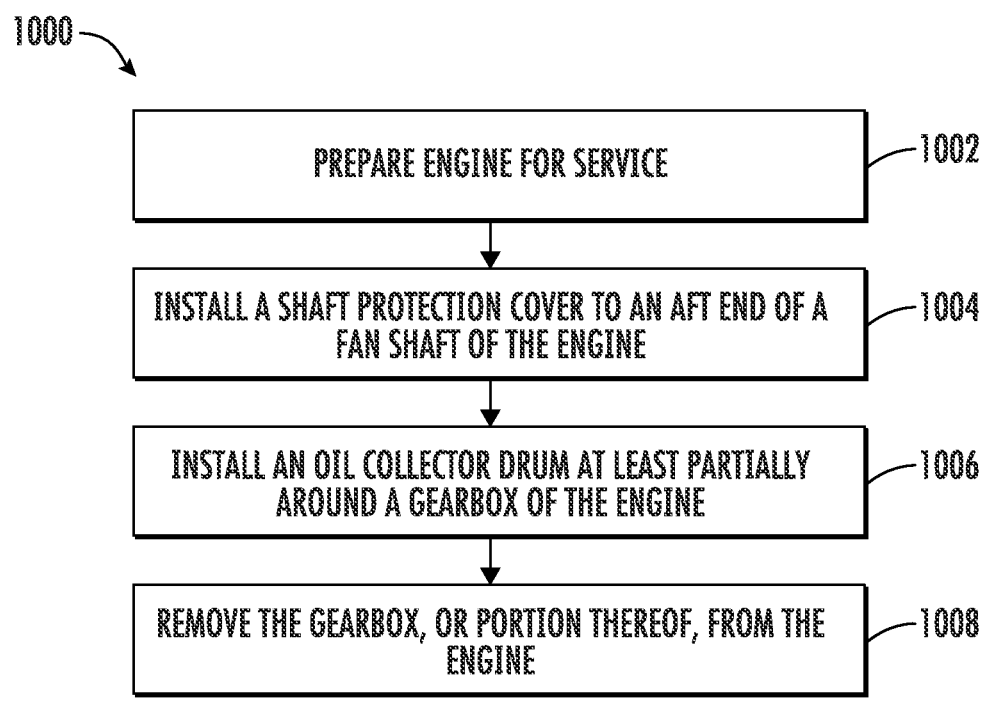
FIG. 10 is a method of servicing a gas turbine engine according to an aspect of the present disclosure.

FIG. 10 includes a flow chart illustrating a method 1000 of servicing a gas turbine engine. The method 1000 can include a step 1002 of preparing the gas turbine engine for service. Preparing the gas turbine engine for service can include removal of one or more components of the gas turbine engine to permit access to an underlying structure or component thereof, such as the gearbox. Preparing the gas turbine engine can also include assembling and/or disassembling of the engine relative to the wing. For instance, preparation of the gas turbine engine can include removing the gas turbine engine from the wing of the aircraft in order to move the engine in the hangar or into a proper control room. This may avoid the gearbox assembly coming into contact with adverse conditions, e.g., dust, powder, rain, wind, extreme temperatures, and the like, that may be encountered on the runway, at the airport, or in a parking area. The method 1000 can further include a step 1004 of installing the shaft protection cover to an aft end of the fan shaft of the gas turbine engine. In certain instances, this step 1004 can be performed by translating the shaft protection cover onto the fan shaft. In an embodiment, the shaft protection cover can be rotated during translation to facilitate easier installation. The method 1000 can further include a step 1006 of installing the oil collector drum at least partially around the gearbox. Steps 1004 and 1006 can be performed either order, i.e., step 1004 followed by step 1006 or step 1006 followed by step 1004. After completion of both steps 1004 and 1006, the method 1000 can further include a step 1008 of removing at least a portion of the gearbox from the gas turbine engine. In certain instances, extraction of oil from the gas turbine engine can occur prior to the step 1008 of removing the gearbox, or a portion thereof. For example, extraction of oil can occur after steps 1004 and 1006 but prior to step 1008. Alternatively, extraction of oil may occur prior to one or both of steps 1004 and/or 1006.

Use of systems and methods described herein may protect the engine and/or operators performing servicing operations on the gas turbine engine from oil contamination during servicing operations. Using the TRF, oil can collect through one or more scavenge holes and drain from the engine at a prescribed location rather than via an undesirable area. Use of systems and methods described herein can increase cleanliness of the workplace and increase workspace safety while reducing the potential for additional servicing steps associated with cleaning oil that may come into contact with the fan shaft or another undesirable portion of the gas turbine engine. Easy disassembly using the systems and methods described herein can reduce service times and cost while creating a minimally invasive workflow for servicing operations.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects of the invention are provided by the subject matter of the following clauses:

A method of servicing a gas turbine engine, the method comprising: preparing the gas turbine engine for service; installing a shaft protection cover to an aft end of a fan shaft of the gas turbine engine; installing an oil collector drum at least partially around a gearbox of the gas turbine engine; and removing at least a portion of the gearbox from the gas turbine engine.

The method of one or more of these clauses, wherein preparing the gas turbine engine for service comprises removing one or more components of the engine to expose the gearbox, the one or more components including at least a tail cone.

The method of one or more of these clauses, further comprising removing oil from the gearbox using an oil extraction system in fluid communication with carrier oil piping of the gas turbine engine, wherein removing oil from the gearbox is performed prior to removing at least the portion of the gearbox from the gas turbine engine.

The method of one or more of these clauses, wherein removing at least the portion of the gearbox from the gas turbine engine causes oil to drip within the gas turbine engine, and wherein the oil protector drum is configured to guide a flow of dripping oil to one or more scavenge holes of the gas turbine engine.

The method of one or more of these clauses, wherein removing at least the portion of the gearbox comprises translating a carrier of the gearbox and one or more planetary gears of the gearbox along an axial direction of the gas turbine engine at a location between the shaft protection cover and the oil collector drum along a radial direction of the gas turbine engine.

The method of one or more of these clauses, further comprising: after removing the portion of the gearbox, removing at least one of the shaft protection cover and the oil collector drum from the gas turbine engine; and removing a remaining portion of the gearbox from the gas turbine engine.

The method of one or more of these clauses, wherein the gearbox comprises a planetary gear set, and wherein the remaining portion of the gearbox comprises a ring gear of the planetary gear set.

The method of one or more of these clauses, wherein installing the shaft protection cover is performed by sliding the shaft protection cover along an axial direction of the gas turbine engine over the aft end of the fan shaft such that an inner member of the shaft protection cover is positioned inside of the fan shaft along a radial direction of the gas turbine engine and an outer member of the shaft protection cover is positioned outside of the fan shaft along the radial direction.

The method of one or more of these clauses, wherein installing the oil collector drum is performed by coupling the oil collector drum to a low-pressure shaft flange of the gas turbine engine.

A kit for servicing a gas turbine engine, the kit comprising: a shaft protection cover configured to be installed adjacent to an aft end of a fan shaft of the gas turbine engine; and an oil collector drum configured to be installed around a gearbox of the gas turbine engine, wherein the kit is usable during servicing operations of the gas turbine engine to manage a flow of oil from the gearbox, an area surrounding the gearbox, or both.

The kit of one or more of these clauses, wherein the oil collector drum comprises a body having a sidewall and substantially open axial ends, wherein one of the substantially open axial ends of the oil collector drum is configured to be coupled with the gas turbine engine to guide free engine fluids to a scavenge hole of the gas turbine engine.

The kit of one or more of these clauses, wherein the oil collector drum is configured to attach to a low-pressure shaft flange of the gas turbine engine.

The kit of one or more of these clauses, wherein the oil collector drum is configured such that the gearbox can pass through the oil collector drum during a gearbox removal operation.

The kit of one or more of these clauses, wherein the oil collector drum is configured to guide the flow of the oil to one or more scavenge holes of the gas turbine engine.

The kit of one or more of these clauses, wherein the shaft protection cover comprises an inner member and an outer member, and wherein the shaft protection cover is configured to receive the aft end of the fan shaft between the inner member and the outer member.

The kit of one or more of these clauses, wherein the shaft protection cover is configured to form an interference fit with the fan shaft.

A tool for servicing a gas turbine engine, the tool comprising at least one of: a shaft protection cover configured to be installed adjacent to an aft end of a fan shaft of the gas turbine engine; and an oil collector drum configured to be installed at least partially around a gearbox of the gas turbine engine, wherein the tool is configured to be used during servicing operations of the gas turbine engine to manage a flow of oil from the gearbox, an area surrounding the gearbox, or both.

The tool of one or more of these clauses, wherein attaching the tool to the gas turbine engine is configured to be performed after removing one or more components of the gas turbine engine to expose the gearbox, the one or more components including at least a tail cone.

The tool of one or more of these clauses, wherein the tool is configured to be used with a gas turbine engine having an aft mounted gearbox.

The tool of one or more of these clauses, wherein the tool is configured to be attached directly to the gas turbine engine using native engine hardware.

What is claimed is:

1. A method of servicing a gas turbine engine, the method comprising:
   preparing the gas turbine engine for service;
   installing a shaft protection cover to an aft end of a fan shaft of the gas turbine engine;
   installing an oil collector drum at least partially around a gearbox of the gas turbine engine; and
   removing at least a portion of the gearbox from the gas turbine engine.

2. The method of claim 1, wherein preparing the gas turbine engine for service comprises removing one or more components of the gas turbine engine to expose the gearbox, the one or more components including at least a tail cone.

3. The method of claim 1, further comprising removing oil from the gearbox using an oil extraction system in fluid communication with carrier oil piping of the gas turbine engine, wherein removing oil from the gearbox is performed prior to removing at least the portion of the gearbox from the gas turbine engine.

4. The method of claim 1, wherein removing at least the portion of the gearbox from the gas turbine engine causes oil to drip within the gas turbine engine, and wherein the oil collector drum is configured to guide a flow of dripping oil to one or more scavenge holes of the gas turbine engine.

5. The method of claim 1, wherein removing at least the portion of the gearbox comprises translating a carrier of the gearbox and one or more planetary gears of the gearbox along an axial direction of the gas turbine engine at a location between the shaft protection cover and the oil collector drum along a radial direction of the gas turbine engine.

6. The method of claim 1, further comprising:
   after removing the portion of the gearbox, removing at least one of the shaft protection cover and the oil collector drum from the gas turbine engine; and
   removing a remaining portion of the gearbox from the gas turbine engine.

7. The method of claim 6, wherein the gearbox comprises a planetary gear set, and wherein the remaining portion of the gearbox comprises a ring gear of the planetary gear set.

8. The method of claim 1, wherein installing the shaft protection cover is performed by sliding the shaft protection cover along an axial direction of the gas turbine engine over the aft end of the fan shaft such that an inner member of the shaft protection cover is positioned inside of the fan shaft along a radial direction of the gas turbine engine and an outer member of the shaft protection cover is positioned outside of the fan shaft along the radial direction.

9. The method of claim 1, wherein installing the oil collector drum is performed by coupling the oil collector drum to a low-pressure shaft flange of the gas turbine engine.

10. A kit for servicing a gas turbine engine, the kit comprising:
    a shaft protection cover configured to be installed adjacent to an aft end of a fan shaft of the gas turbine engine; and
    an oil collector drum configured to be installed around a gearbox of the gas turbine engine,
    wherein the kit is usable during servicing operations of the gas turbine engine to manage a flow of oil from the gearbox, an area surrounding the gearbox, or both.

11. The kit of claim 10, wherein the oil collector drum comprises a body having a sidewall and substantially open axial ends, wherein one of the substantially open axial ends of the oil collector drum is configured to be coupled with the gas turbine engine to guide free engine fluids to a scavenge hole of the gas turbine engine.

12. The kit of claim 10, wherein the oil collector drum is configured to attach to a low-pressure shaft flange of the gas turbine engine.

13. The kit of claim 10, wherein the oil collector drum is configured such that the gearbox can pass through the oil collector drum during a gearbox removal operation.

14. The kit of claim 10, wherein the oil collector drum is configured to guide the flow of the oil to one or more scavenge holes of the gas turbine engine.

15. The kit of claim 10, wherein the shaft protection cover comprises an inner member and an outer member, and wherein the shaft protection cover is configured to receive the aft end of the fan shaft between the inner member and the outer member.

16. The kit of claim 10, wherein the shaft protection cover is configured to form an interference fit with the fan shaft.

17. A tool for servicing a gas turbine engine, the tool comprising at least one of:
- a shaft protection cover configured to be installed adjacent to an aft end of a fan shaft of the gas turbine engine; and
- an oil collector drum configured to be installed at least partially around a gearbox of the gas turbine engine,
- wherein the tool is configured to be used during servicing operations of the gas turbine engine to manage a flow of oil from the gearbox, an area surrounding the gearbox, or both, and
- wherein attaching the tool to the gas turbine engine is configured to be performed after removing one or more components of the gas turbine engine to expose the gearbox, the one or more components including at least a tail cone.

18. The tool of claim 17, wherein the tool is configured to be used with a gas turbine engine having an aft mounted gearbox.

19. The tool of claim 17, wherein the tool is configured to be attached directly to the gas turbine engine using native engine hardware.

* * * * *